United States Patent
Moniwa et al.

(10) Patent No.: US 8,329,031 B2
(45) Date of Patent: Dec. 11, 2012

(54) WATER TREATMENT APPARATUS

(75) Inventors: Shinobu Moniwa, Kawasaki (JP); Masahiko Tsutsumi, Fuchu (JP); Hidetake Shiire, Tokyo (JP); Nobuyuki Ashikaga, Kawasaki (JP); Satomi Ebihara, Tokyo (JP); Katsuya Yamamoto, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 306 days.

(21) Appl. No.: 12/694,620

(22) Filed: Jan. 27, 2010

(65) Prior Publication Data

US 2010/0230343 A1  Sep. 16, 2010

(30) Foreign Application Priority Data

Mar. 13, 2009  (JP) .................................. 2009-061989

(51) Int. Cl.
*B01D 24/12* (2006.01)

(52) U.S. Cl. ........ 210/189; 210/253; 210/264; 210/275; 210/502.1; 210/512.1

(58) Field of Classification Search .................. 210/189, 210/253, 264, 275, 502.1, 661, 683, 906, 210/512.1
See application file for complete search history.

(56) References Cited

U.S. PATENT DOCUMENTS

| | | | | |
|---|---|---|---|---|
| 3,802,567 A | * | 4/1974 | Kunz | 210/189 |
| 4,935,146 A | * | 6/1990 | O'Neill et al. | 210/684 |
| 5,360,547 A | * | 11/1994 | Cockett et al. | 210/690 |
| 6,413,432 B1 | * | 7/2002 | Kumaoka | 210/669 |

FOREIGN PATENT DOCUMENTS

| | | |
|---|---|---|
| JP | 59-156489 | 9/1984 |
| JP | 2002-224663 | 8/2002 |
| JP | 2002-282711 | 10/2002 |
| JP | 2004-261729 | 9/2004 |
| JP | 2004-298668 | 10/2004 |
| JP | 2007-7530 | 1/2007 |
| JP | 2007-260561 | 10/2007 |
| JP | 2008-49241 | 3/2008 |
| JP | 2008-272742 | 11/2008 |
| WO | WO 01/79117 A2 | 10/2001 |

OTHER PUBLICATIONS

Search Report and Written Opinion issued by the Intellectual Property Office of Singapore on Sep. 30, 2010, for Singapore Patent Application No. 201000670-8.
Fukaya et al., U.S. Appl. No. 12/708,846, filed Feb. 19, 2010.
Tsutsumi et al., U.S. Appl. No. 12/695,950, filed Jan. 28, 2010.
Notification for Filing Opinion, mailed Mar. 5, 2012, from the Korean Patent Office in corresponding Korean Pat. App. No. 10-2010-0003464, and English translation thereof (11 pages total).

* cited by examiner

*Primary Examiner* — Matthew Savage
(74) *Attorney, Agent, or Firm* — Finnegan, Henderson, Farabow, Garrett & Dunner, L.L.P.

(57) ABSTRACT

A water treatment apparatus includes a first treatment tank forming thereon a first, fixed bed includes a powdery phosphorus adsorbent includes an inorganic layered compound, wherein the first bed separates phosphorus and solid matter from the water, and recovers the phosphorus in a state adsorbed on the phosphorus adsorbent in the first bed, a second treatment tank forming a second, fluidized or fixed bed includes the phosphorus adsorbent, wherein the second bed separates phosphorus from the water received from the first treatment tank, and recovers the phosphorus in a state adsorbed on the phosphorus adsorbent in the second bed, and a transferring line configured to transfer the phosphorus adsorbent, having phosphorus adsorbed thereon in the second treatment tank, from the second treatment tank to the first treatment tank.

10 Claims, 3 Drawing Sheets

WATER TREATMENT APPARATUS

CROSS-REFERENCE TO RELATED APPLICATIONS

This application is based upon and claims the benefit of priority from prior Japanese Patent Application No. 2009-061989, filed Mar. 13, 2009, the entire contents of which are incorporated herein by reference.

BACKGROUND OF THE INVENTION

1. Field of the Invention

The present invention relates to a water treatment apparatus to recover and recycle phosphorus contained in water to be treated. Particularly, the present invention relates to a water treatment apparatus to treat water generated in the process of treating excess sludge derived from biological wastewater treatment, such as activated sludge treatment, for treating sewage or industrial wastewater from, for example, food-processing plants.

2. Description of the Related Art

Now, it is predicted that phosphorus resources will be depleted worldwide in the future. However, Japan depends on imports for phosphorus resources, and therefore attention is being paid to a technique for recovering phosphorus contained in wastewater.

Phosphorus contained in wastewater becomes one of causes of eutrophication when discharged into the environment, and therefore it is absolutely necessary to remove phosphorus from wastewater and monitor the discharge of phosphorus into the environment. For this reason, until now, a technique for removing phosphorus from wastewater has been most actively studied. Representative examples of the technique for removing phosphorus include a biological phosphorus removal method using the ability of microorganisms to accumulate phosphorus and a coagulating sedimentation method.

In order to directly use such a phosphorus removal method as means for recovering and recycling phosphorus, it is necessary to additionally provide some treatment processes such as a process of incinerating excess sludge generated by biological phosphorus removal and a chemical treatment process using large amounts of chemicals. For example, in order to recycle recovered phosphorus as phosphorus resources, it is necessary to eliminate the influence of chemicals used and impurities derived from, for example, sludge, and therefore it is absolutely necessary to provide a process of preparing phosphorus resources or a process of purifying recovered phosphorus.

In view of such a technical background, recently, attention is being paid to a water treatment technique using a phosphorus adsorbent that selectively adsorbs phosphate anions. It is to be noted that in this specification, adsorbing phosphate anions is simply referred to as "adsorb phosphorus", desorbing phosphate anions is simply referred to as "desorb phosphorus", and recovering phosphate anions is simply referred to as "recover phosphorus". Examples of an anion exchanger that selectively removes an anion such as phosphate anion include anion exchange resins and hydrotalcite-like inorganic layered compounds. Various methods for producing such an anion exchanger and various methods for recovering phosphorus using an advanced adsorbent utilizing the material characteristics of an anion exchanger have been developed.

For example, Jpn. Pat. Appln. KOKAI Publication Nos. 2007-260561 (Document 1) and 2008-49241 (Document 2) each disclose a phosphorus recoverion system using an adsorbent having the function of a hydrotalcite-like substance.

More specifically, Document 1 discloses a technique in which phosphorus contained in wastewater is adsorbed to a phosphorus adsorbent obtained by imparting the function of a hydrotalcite-like substance to an organic material, and then the phosphorus is desorbed from the adsorbent using a chemical solution, and then crystals of a phosphorus-containing salt are recovered from the chemical solution. Document 2 discloses a technique similar to the technique disclosed in Document 1, in which phosphorus contained in wastewater is adsorbed to an adsorbent containing a hydrotalcite-like material, and then the phosphorus is desorbed from the adsorbent to reuse the adsorbent.

However, in the cases of such conventional techniques disclosed in Documents 1 and 2, in addition to the need to impart phosphorus adsorption function to an organic material, a treatment system needs to have a structure to fix the phosphorus adsorbent, treatment cost increases due to an increase in, for example, production cost of the adsorbent, and it is absolutely necessary to treat the adsorbent to reuse it. Therefore, it is necessary to provide, after a phosphorus adsorption process, a process of desorbing phosphorus from the adsorbent using a large amount of a chemical. Further, as described above, since the adsorbent is obtained by imparting the function of adsorbing phosphorus to an organic material, it is difficult to increase the phosphorus content in the recovered adsorbent. In addition, it is also difficult to recycle the adsorbent having phosphorus adsorbed thereto as it is as phosphorus resources because the adsorbent contains the organic material.

Further, Jpn. Pat. Appln. KOKAI Publication No. 2004-261729 (Document 3) discloses a multistage semibatch adsorption system using an adsorbent.

However, as in the cases of the conventional techniques disclosed in Documents 1 and 2, also in the case of the conventional technique disclosed in Document 3, the adsorbent is not recycled as resources but is disposed of or reused as an adsorbent, and further there is a problem in that if water to be treated contains suspended solids, the surface of the adsorbent is soiled with the suspended solids.

BRIEF SUMMARY OF THE INVENTION

It is therefore an object of the present invention to provide a water treatment apparatus to treat, as water to be treated, a liquid generated by solid-liquid separation of sludge in the process of treating sludge discharged from biological wastewater treatment process in order to separate, from the water to be treated, both suspended solids and phosphorus with the use of an adsorbent to recover and recycle the adsorbent as phosphorus-containing resources.

A water treatment apparatus according to the present invention comprises: a first treatment tank which receives water to be treated, and includes a first support, forming thereon a first, fixed bed comprising a powdery phosphorus adsorbent comprising an inorganic layered compound, wherein the first bed separates phosphorus and solid matter from the water, and recovers the phosphorus in a state adsorbed on the phosphorus adsorbent in the first bed, which is usable as it is; a second treatment tank which receives the water treated in the first treatment tank and a powdery phosphorus adsorbent comprising an inorganic layered compound, and includes a second support, forming a second, fluidized or fixed bed comprising the phosphorus adsorbent, wherein the second bed separates phosphorus from the water received from the first treatment tank, and recovers the phosphorus in a state adsorbed on the phosphorus adsorbent in the second bed, which is usable as it is; and a transferring device configured to transfer the phosphorus adsorbent, having phosphorus adsorbed thereon in the second treatment tank, from the second treatment tank to the first treatment tank.

DETAILED DESCRIPTION OF THE INVENTION

The present invention is applied to a water treatment apparatus to treat a liquid generated by solid-liquid separation of sludge in the process of treating excess sludge originating from biological wastewater treatment, such as activated sludge treatment, for treating sewage or industrial wastewater from, for example, food-processing plants. Particularly, the present invention is applied to a water treatment apparatus for use in biological wastewater treatment process which includes a route or line to return, to the upstream side thereof, a liquid generated by solid-liquid separation of sludge originated therefrom. That is, water to be treated by the water treatment apparatus according to the present invention is a liquid generated by solid-liquid separation of sludge in the process of treating sludge originated from biological water treatment.

Figure 1:
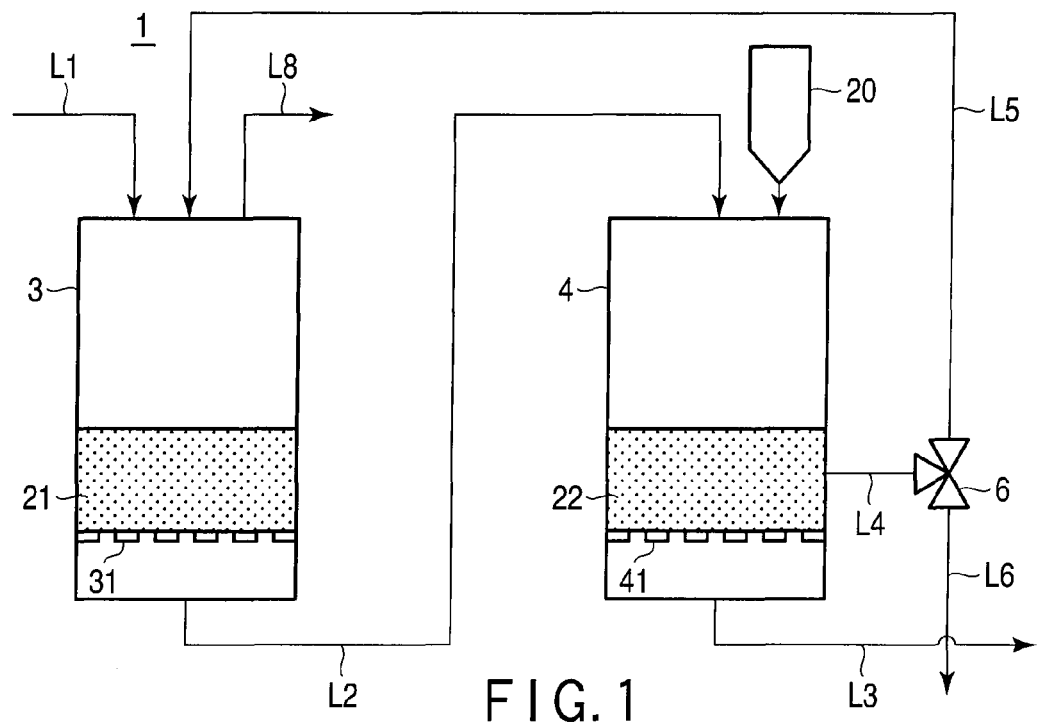
FIG. 1 is a block diagram showing the structure of a water treatment apparatus according to a first embodiment of the present invention.
Figure 2:
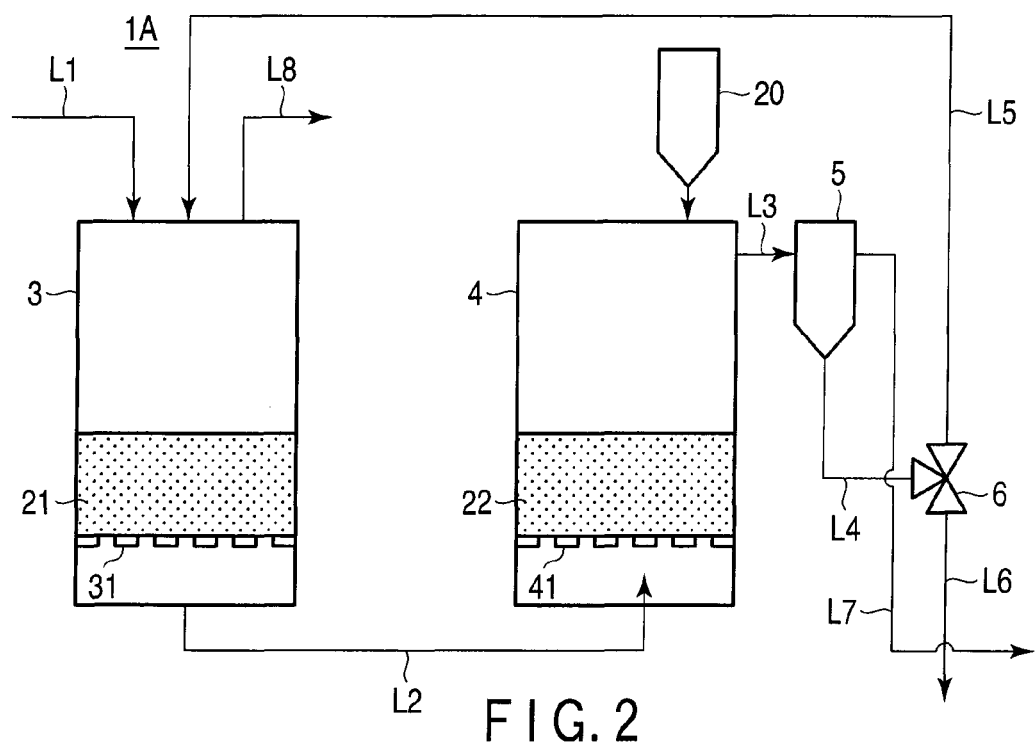
FIG. 2 is a block diagram showing the structure of a water treatment apparatus according to a second embodiment of the present invention.
Figure 3:
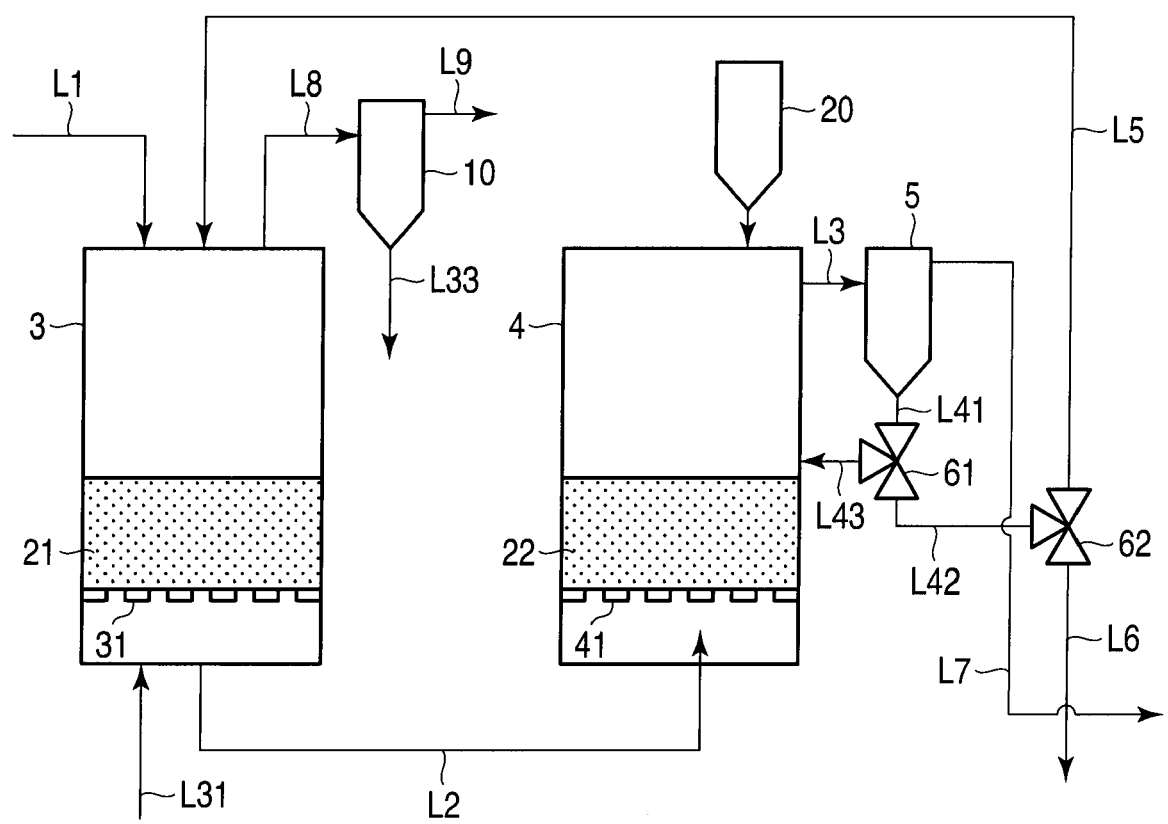
FIG. 3 is a block diagram showing the structure of a water treatment apparatus according to a third embodiment of the present invention.
Figure 4:
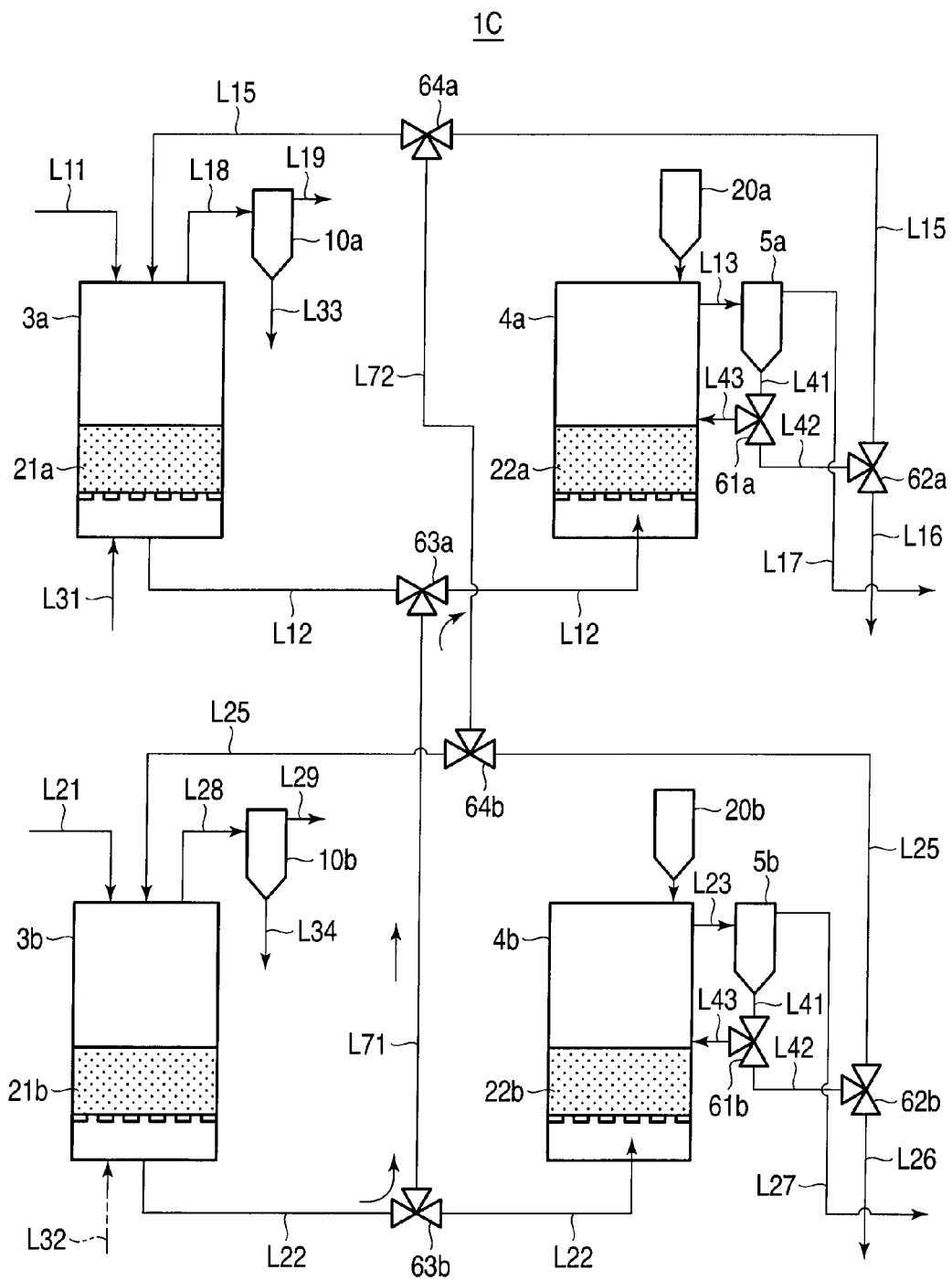
FIG. 4 is a block diagram showing the structure of a water treatment apparatus according to a fourth embodiment of the present invention.

In the water treatment apparatus according to the present invention, a first treatment tank, into which water to be treated is introduced, needs to be in a form of first, fixed-bed reactor, but a second treatment tank, into which an adsorbent is introduced, may be any one of in a form of a fluidized-bed reactor (FIGS. 2 to 4), a fixed-bed reactor (FIG. 1), and a moving-bed reactor. In the water treatment apparatus according to the present invention, an adsorbent reactor formed in the second treatment tank may be any one of in a form of a fixed-bed, a moving-bed, and a fluidized-bed, and the adsorbent reactor type of the second treatment tank is not particularly limited here. However, in some cases, the second treatment tank is preferably in a form of fluidized-bed reactor (FIGS. 2 to 4). This is because, by forming a fluidized bed of an adsorbent in the second treatment tank, it is possible to smoothly and easily transfer the adsorbent from the second treatment tank to the first treatment tank.

It is preferred that the water treatment apparatus according to the present invention further comprises solid-liquid separator configured to separate the phosphorus adsorbent from the water discharged from the second treatment tank (FIGS. 3 and 4). It is also preferred that the water treatment apparatus according to the present invention further comprises centrifugal separator to separate the phosphorus adsorbent and solid matter from the water discharged from the first treatment tank (FIGS. 2 to 4). As such solid-liquid centrifugal separator, a cyclone can be used. As the powdery phosphorus adsorbent comprising an inorganic layered compound, a hydrotalcite-like substance can be used. The hydrotalcite-like substance may be the hydrotalcite compound disclosed in Japanese Patent Application 2007-260561 having the formula:

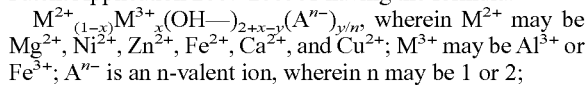
wherein $M^{2+}$ may be $Mg^{2+}$, $Ni^{2+}$, $Zn^{2+}$, $Fe^{2+}$, $Ca^{2+}$, and $Cu^{2+}$; $M^{3+}$ may be $Al^{3+}$ or $Fe^{3+}$; $A^{n-}$ is an n-valent ion, wherein n may be 1 or 2; $0.1 \leq x \leq 0.5$; and $0.1 \leq y \leq 0.5$. The hydrotalcite-like substance has a specific gravity larger than 1 and close to 2, and therefore actually, the specific gravity of the hydrotalcite-like substance is larger than that of solid matter originated from sludge. For this reason, a cyclone is suitable as solid-liquid centrifugal separator for separating a phosphorus adsorbent and solid matter from water received from the first treatment tank.

It is also preferred that the water treatment apparatus according to the present invention further comprises backwash water introduction device configured to introduce the water discharged from at least one of the first treatment tank and the second treatment tank into the first treatment tank as backwash water to separate a phosphorus adsorbent and solid matter from the first bed in the first treatment tank (FIGS. 3 and 4).

It is also preferred that the water treatment apparatus according to the present invention has two or more first treatment tanks arranged in parallel. It is also preferred that the water treatment apparatus according to the present invention has two or more second treatment tanks arranged in parallel downstream from the first treatment tank (FIG. 4). This is because the first treatment tank that is being backwashed cannot send treated water to the second treatment tank, but by arranging the two or more first treatment tanks in parallel, it is possible to send treated water from another first treatment tank that is not being backwashed to the second treatment tank by switching a flow path. Further, by arranging the two or more second treatment tanks in parallel, it is possible to efficiently transfer an adsorbent having phosphorus adsorbed thereto to the first treatment tank.

In the water treatment apparatus according to the present invention, a fresh adsorbent having a high ability to adsorb phosphorus is charged into the second treatment tank in which water to be treated having a low phosphorus content flows, and the phosphorus adsorbent having phosphorus adsorbed thereto in the second treatment tank is transferred from the second treatment tank to the first treatment tank to bring the adsorbent whose ability to adsorb phosphorus has been reduced into contact with water to be treated (raw water) having a high phosphorus content. This makes it possible to achieve a good balance in adsorption reaction efficiency between the first treatment tank and the second treatment tank, thereby enabling phosphorus adsorption reaction to be always performed under the best conditions. Therefore, phosphorus recovery efficiency is very high as a whole. According to the present invention, it is possible to recover phosphorus using a phosphorus adsorbent and to recycle the phosphorus adsorbent having phosphorus adsorbed thereto as it is. For example, the phosphorus adsorbent having recovered phosphorus adsorbed thereto can be used as a fertilizer on a cropland as it is.

The application of the water treatment apparatus according to the present invention to wastewater generated in the process of treating excess sludge has the following advantage. Usually, a liquid generated by solid-liquid separation of sludge in the process of treating excess sludge is returned to the upstream side of biological water treatment process from which the sludge is derived. Therefore, the application of the water treatment apparatus according to the present invention aimed at recycling recovered phosphorus as resources to a liquid generated in the process of treating excess sludge makes it possible to reduce the risk of water contamination associated with fluctuations in the phosphorus concentration in final effluent discharged from the entire treatment system, as compared to a case where the water treatment apparatus according to the present invention is applied to influent water into the entire treatment system or effluent water from the entire treatment system.

Further, it is not necessary to provide various processes such as a process of desorbing a phosphorus component from a phosphorus adsorbent, a process of regenerating an adsorbent, and a process of recovering crystals of a phosphorus component, thereby eliminating the use of chemicals and the like.

Further, it is possible to recover phosphorus while suppressing a reduction in the phosphorus adsorption ability of an adsorbent due to the influence of suspended solids flowing into the phosphorus recoverable water treatment apparatus without providing a solid-liquid separation apparatus such as a membrane separation apparatus. Therefore, an adsorbent having a high phosphorus content can be recovered and then used as it is as phosphorus-containing resources.

Hereinbelow, various preferred embodiments of the water treatment apparatus according to the present invention will be described with reference to the accompanying drawings.

FIRST EMBODIMENT

A water treatment apparatus according to a first embodiment of the present invention will be described with reference to FIG. 1.

A water treatment apparatus 1 according to the first embodiment of the present invention comprises a first treatment tank 3 and a second treatment tank 4 as reactor-type treatment tanks. The first treatment tank 3 is provided on the upstream side to receive water to be treated which is supplied from a raw water supply source (not shown), and allows the water to be treated to flow downwardly to recover phosphorus contained therein. In order to recover phosphorus, a first, fixed bed 21 of a particulate phosphorus adsorbent is formed on a support 31 provided in the first treatment tank 3. The second treatment tank 4 is provided downstream from the first treatment tank 3 to receive water to be treated which is sent from the first treatment tank 3 to an upper part thereof, and allows the water to be treated to flow downwardly to recover phosphorus contained therein. In order to recover phosphorus, a second, fixed bed 22 of a particulate phosphorus adsorbent is formed on a support 41 provided in the second treatment tank 4.

The phosphorus adsorbent forming these fixed beds 21 and 22 is made of an inorganic layered anion exchanger, and is preferably in the form of hydrotalcite-like inorganic particles having an adsorption site. The hydrotalcite-like inorganic particles have a specific gravity of, for example, about 2, and are therefore immediately settled and accumulated on the support 41 when supplied to the second treatment tank 4 from an adsorbent supply source 20. It is preferred that the phosphorus adsorbent described here is not made of a composite material of the inorganic layered anion exchanger and another organic or inorganic material.

A fresh phosphorus adsorbent is additionally supplied from the adsorbent supply source 20 into the second treatment tank 4 as need arises. Further, although the first bed 21 is previously formed by charging a predetermined amount of an adsorbent into the first treatment tank 3 before the start of treatment, an adsorbent contained in the second treatment tank 4 can be transferred to the first treatment tank 3 to compensate for a reduction in the adsorption ability of the first bed 21 due to the fact that the adsorbent held by the support 31 escapes from the first treatment tank 3 little by little. More specifically, by operating a three-way valve 6 to switch a line connected to a line L4 from a discharge line L6 to a transfer line L5, it is possible to transfer to the first treatment tank 3 through the transfer line L5, an adsorbent taken out of the second treatment tank 4 as the need arises through the line L4 being in communication with the second bed 22 provided in the second treatment tank 4. This makes it possible to additionally supply an adsorbent to the first fixed bed 21 provided in the first treatment tank 3, thereby improving the adsorption ability of the first fixed bed 21 provided in the first treatment tank 3. In addition, it is also possible to achieve a good balance between a combination of the adsorption ability (slightly low adsorption ability) of the first fixed bed 21 provided in the first treatment tank 3 and the phosphorus concentration (high concentration) in water to be treated and a combination of the adsorption ability (high adsorption ability) of the second fixed bed 22 provided in the second treatment tank 4 and the phosphorus concentration (slightly low concentration) in water to be treated. This makes it possible to efficiently perform phosphorus recovery treatment as a whole of the system.

It is to be noted that each of lines L1 to L6 and L8 include a pump and a valve which are not shown. By controlling the operation of these pumps and valves by a controller not shown, it is possible to adjust the flow rate and pressure of each of the lines to optimum values.

Water to be treated by the water treatment apparatus 1 is derived from a liquid generated by solid-liquid separation of sludge in the process of treating excess sludge discharged from biological wastewater treatment equipment not shown, and contains organic phosphorus in an amount of, for example, about 20 to 140 mg/L. The process of treating excess sludge described here may be any one of a sludge concentration process, a sludge dewatering process, and a process of dewatering anaerobic digested sludge. More preferably, water to be treated by the water treatment apparatus 1 is a liquid generated by solid-liquid separation of sludge in the process of treating sludge derived from sewage treatment because the amount and quality of water to be treated become stable, which is advantageous to scheduled phosphorus recovery.

The water to be treated is introduced into the first treatment tank 3 through the raw water introduction line L1 connected to the upper part of the first treatment tank 3, and as a first step, phosphorus is adsorbed to an adsorbent in the first fixed bed 21 provided in the first treatment tank 3 while the water to be treated flows downwardly in the first treatment tank 3. Then, the water to be treated is discharged from the first treatment tank 3 through the transfer line L2 connected to the lower part of the first treatment tank 3 and is then introduced into an upper part of the second treatment tank 4, and as a second step, phosphorus is adsorbed to the adsorbent in the fixed bed 22 provided in the second treatment tank 4 while the water to be treated flows downwardly in the second treatment tank 4. Then, treated water is discharged through the discharge line L3 connected to the lower part of the second treatment tank 4 to the outside of the system.

By operating the three-way valve 6, it is possible to transfer part of the phosphorus adsorbent having phosphorus adsorbed thereto in the second treatment tank 4 to the first treatment tank 3 through the transfer line L5, which makes it possible to use the adsorbent, having been used in the fixed bed 22 provided in the second treatment tank 4, in the fixed bed 21 provided in the first treatment tank 3.

Hereinbelow, the effects of the first embodiment according to the present invention will be described.

As described above, water to be treated by the water treatment apparatus 1 according to the first embodiment of the present invention is a liquid generated by solid-liquid separation of sludge, and usually contains suspended solids. Therefore, in a process using an adsorbent, there is a possibility that the adsorbent will be soiled with the suspended solids adsorbed thereto. For this reason, the water treatment apparatus 1 is required to have a structure capable of eliminating the influence of the suspended solids. In the first embodiment, the phosphorus adsorption capacity of a phosphorus adsorbent is kept at a certain level or higher in the following manner.

First of all, the first fixed bed 21 of a phosphorus adsorbent is provided in the first treatment tank 3, and then the water to be treated, containing suspended solids and phosphorus, is introduced into the first treatment tank 3 and is allowed to flow through the fixed bed 21 of the phosphorus adsorbent, and as a result the suspended solids are filtered out and the phosphorus is adsorbed to the phosphorus adsorbent so that treated water containing no suspended solids is discharged from the first treatment tank 3. The treated water discharged from the first treatment tank 3 is allowed to flow through the second treatment tank 4, and therefore a phosphorus adsorbent contained in the second treatment tank 4 can adsorb phosphorus without the influence of suspended solids.

Secondly, the treated water introduced into the second treatment tank 4 from the first treatment tank 3 has a lower phosphorus concentration than the raw water supplied from the raw water supply source. Therefore, in order to recover a larger amount of phosphorus from the treated water discharged from the first treatment tank 3, a phosphorus adsorbent to be used in the second treatment tank 4 preferably has a smaller amount of phosphorus adsorbed thereto. Therefore, by using an unused fresh phosphorus adsorbent, supplied from the supply source 20, in the second treatment tank 4, it is possible to efficiently adsorb phosphorus. Further, an adsorbent having a certain amount of phosphorus adsorbed thereto in the second treatment tank 4 is then used in the fixed bed 21 provided in the first treatment tank 3 to adsorb phosphorus and remove suspended solids. This makes it possible to always keep the phosphorus content in a spent phosphorus adsorbent discharged from the first treatment tank 3 at a certain level or higher, thereby ensuring the quality of the spent phosphorus adsorbent to be recycled as phosphorus resources.

The above-described two effects make it possible to utilize a spent phosphorus adsorbent as phosphorus resources. Further, by using, as a phosphorus adsorbent, an inorganic layered compound, such as a hydrotalcite-like substance, which is an inorganic anion exchanger and widely known as a compound having a high phosphorus adsorption ability, it is possible to recycle the spent phosphorus adsorbent as phosphorus resources having high compatibility with an environment where it is recycled. As metal ions constituting such a hydrotalcite-like substance, a divalent metal ion of an alkaline-earth metal or the like and a trivalent metal ion can be used in combination, but any elements that are in a form usable as phosphorus resources can be selected. Here, the kinds of the divalent metal ion and the trivalent metal ion constituting a hydrotalcite-like substance and the ratio between the divalent metal ion and the trivalent metal ion are not particularly limited, and a method for producing a hydrotalcite-like substance is not particularly limited, either, and can be selected from well-known methods. Further, it is preferred that the material of a phosphorus adsorbent is selected according to the usage of the spent phosphorus adsorbent and has high compatibility with an environment where the spent phosphorus adsorbent is recycled. Further, in the second treatment process, the two or more second treatment tanks are preferably arranged in a multistage manner, such as in-line arrangement, in the direction of a treatment process flow. This increases the recovered amount of phosphorus.

The use of the water treatment apparatus according to the first embodiment of the present invention makes it possible to omit some processes conventionally performed such as a pretreatment process, a process of treating a spent phosphorus adsorbent, and a process of treating a recovered phosphorus component. Further, the use of the water treatment apparatus according to the first embodiment of the present invention also makes it possible to efficiently recover phosphorus contained in water to be treated without placing an additional load on the environment while suppressing the influence of suspended solids contained in the water to be treated so that a spent phosphorus adsorbent having phosphorus adsorbed thereto in a certain amount or more can be obtained and used as it is as phosphorus resources.

SECOND EMBODIMENT

Hereinbelow, a second embodiment of the present invention will be described with reference to FIG. 2. It is to be noted that descriptions overlapping with the above embodiment will be omitted or simplified.

In a water treatment apparatus 1A according to the second embodiment of the present invention, a second bed 22 in the second treatment tank 4 is in a form of a fluidized-bed, and the discharge line L3, through which treated water is discharged from the second treatment tank 4, is connected to a solid-liquid separator 5 to separate and recover an adsorbent constituting the fluidized bed (second bed) 22 which has flowed out from the second treatment tank 4 together with treated water discharged from the second treatment tank 4. More specifically, the bottom part of the solid-liquid separator 5 is connected to the line L4 being in communication with the three-way valve 6, and the three-way valve 6 is operated to switch a line connected to the line L4 from the discharge line L6 to the transfer line L5 so that solids (adsorbent) separated and recovered by the solid-liquid separator 5 can be transferred to the first treatment tank 3 through the transfer line L5. It is to be noted that lines L1 to L8 of the water treatment apparatus 1A according to the second embodiment of the present invention each of the lines L1 to L8 include a pump not shown.

As described above, since the second treatment tank 4 of the water treatment apparatus 1A according to the second embodiment of the present invention is in a form of a fluidized-bed reactor, contact efficiency between water to be treated and a phosphorus adsorbent in the system is improved. Further, in a case where the second treatment tank 4 is in a form of a fluidized-bed reactor, a difference in the amount of phosphorus adsorbed to an adsorbent (the dispersion in the amounts of adsorbed phosphorus) from upstream to downstream in the flow direction of water introduced into the second treatment tank 4 can be made smaller then a case where the second treatment tank 4 is in a form of a fixed-bed reactor. Further, according to the second embodiment, a phosphorus adsorbent having been used in the fluidized bed 22 provided in the second treatment tank 4 is used in the fixed bed 21 provided in the first treatment tank 3, and therefore it is possible to obtain the spent phosphorus adsorbent having a certain amount of phosphorus adsorbed thereto.

As the solid-liquid separator 5 connected to the second treatment tank 4 of the water treatment apparatus 1A according to the second embodiment of the present invention, a solid-liquid centrifugal separator such as a cyclone can be used. By providing such a solid-liquid centrifugal separator 5, it is possible to suppress the escape of a phosphorus adsorbent having only a small amount of phosphorus adsorbed thereto to the outside of the system together with treated water discharged from the second treatment tank 4. In addition, it is also possible to retain just the right amount of the phosphorus adsorbent for use in the first treatment tank 3. It is to be noted that in a case where a cyclone is used as the solid-liquid centrifugal separator 5 to be connected to the second treatment tank 4, the water treatment apparatus 1A becomes more compact and space-saving as compared to a case where a solid-liquid separator utilizing gravity sedimentation such as a settling tank is used. Further, by arranging two or more cyclones in series in a multistage manner, it is possible to more efficiently suppress the escape (flow out) of a phosphorus adsorbent from the fluidized bed 22 provided in the second treatment tank 4.

The use of the water treatment apparatus according to the second embodiment of the present invention makes it possible to more stably recover a spent phosphorus adsorbent having phosphorus adsorbed thereto in a certain amount or more, thereby eliminating some processes conventionally performed such as a pretreatment process, a process of treating a spent phosphorus adsorbent, and a process of treating a recovered phosphorus component. In addition, it is also possible to efficiently recover phosphorus contained in water to be treated without placing an additional load on the environment while suppressing the influence of suspended solids contained in the water to be treated so that a spent phosphorus adsorbent having phosphorus adsorbed thereto in a certain amount or more can be obtained and used as it is as phosphorus resources.

THIRD EMBODIMENT

A third embodiment of the present invention will be described with reference to FIG. 3. It is to be noted that descriptions overlapping with the above embodiments will be omitted or simplified.

In a water treatment apparatus 1B according to the third embodiment of the present invention, the bottom part of the first treatment tank 3 including the fixed bed 21 of a phosphorus adsorbent is connected to a backwash water line L31, and a solid-liquid separator 10 is connected to a discharge line L8 to separate solids discharged from the first treatment tank 3 during backwashing from backwash water. It is to be noted that the water treatment apparatus 1B according to the third embodiment of the present invention is substantially the same as the water treatment apparatus 1A according to the second embodiment in that the second treatment tank 4 is in a form of a fluidized-bed reactor, and the solid-liquid separator 5 is connected to the discharge line L3, through which treated water is discharged from the second treatment tank 4, to separate and recover an adsorbent constituting the fluidized bed 22 which has escaped from the second treatment tank 4 together with treated water discharged from the second treatment tank 4. It is to be noted that lines L1 to L9, L42, and L43 provided in the water treatment apparatus 1B according to the third embodiment each include a pump not shown.

Hereinbelow, the effects of the water treatment apparatus according to the third embodiment of the present invention will be described.

In the first treatment tank 3, both phosphorus adsorption and separation of suspended solids contained in water to be treated are performed, and therefore a pressure at which water to be treated is introduced into the first treatment tank 3 is increased due to, for example, accumulation of suspended solids. Therefore, it is necessary to regularly remove accumulated suspended solids. In order to remove such suspended solids, it is necessary to regularly take suspended solids accumulated in the first fixed bed 21 and a phosphorus adsorbent out of the first treatment tank 3 from the upper side of the first fixed bed 21 by supplying backwash water through the backwash water line L3. Here, water to be used as backwash water supplied through the backwash water line L3 is preferably water generated by solid-liquid separation. For example, treated water discharged from the first treatment tank or treated water discharged from the second treatment tank 4 can be used, in which case such treated water is stored in a tank (not shown) or the like. As the solid-liquid separator 10 connected to the first treatment tank 3, one utilizing an existing separation technique capable of separating a phosphorus adsorbent and suspended solids from each other can be used. Here, a cyclone is used as the solid-liquid separator 10 connected to the first treatment tank 3. In this case, a phosphorus adsorbent and suspended solids can be separated from each other by utilizing a difference in specific gravity between them. It is to be noted that a recovered phosphorus adsorbent may be returned to the first treatment tank 3 depending on the degree of phosphorus adsorption. In this case, the discharge line L33 is preferably connected to the upper part of the first treatment tank 3.

The use of the water treatment apparatus according to the third embodiment of the present invention makes it possible to properly remove solids from water to be treated and therefore to omit some processes conventionally performed such as a pretreatment process, a process of treating a spent phosphorus adsorbent, and a process of treating a recovered phosphorus component. In addition, it is also possible to efficiently recover phosphorus contained in water to be treated without placing an additional load on the environment while suppressing the influence of suspended solids contained in the water to be treated so that a spent phosphorus adsorbent having phosphorus adsorbed thereto in a certain amount or more can be obtained and used as it is as phosphorus resources.

FOURTH EMBODIMENT

Hereinbelow, a fourth embodiment of the present invention will be described with reference to FIG. 4. It is to be noted that descriptions overlapping with the above embodiments will be omitted or simplified.

In a water treatment apparatus 1C according to the fourth embodiment of the present invention, two first treatment tanks 3a and 3b are arranged in parallel, and two second treatment tanks 4a and 4b are also arranged in parallel. A combination of the first treatment tank 3a and the second treatment tank 4a (hereinafter, also referred to as a "first set") and a combination of the first treatment tank 3b and the second treatment tank 4b (hereinafter, also referred to as a "second set") each have substantially the same structure as the water treatment apparatus 1B according to the third embodiment of the present invention.

The former combination includes a line L12 for transferring water to be treated, and the latter combination includes a line L22 for transferring water to be treated, and the line L12 and the line L22 are connected to each other by a bypass line L71. The bypass line L71 includes three-way valves 63a and 63b provided at opposite ends thereof.

Further, the former combination includes an adsorbent transfer line L15, and the latter combination includes an adsorbent transfer line L25, and the line L15 and the line L25 are connected to each other by a bypass line L72. The bypass line L72 includes three-way valves 64a and 64b provided at opposite ends thereof.

In normal steady operation of the water treatment apparatus 10 according to the fourth embodiment of the present invention, water to be treated is transferred from the first treatment tank 3a to the second treatment tank 4a through the line L12, and an adsorbent is transferred from the second treatment tank 4a to the first treatment tank 3a through the line L15. In parallel with this, water to be treated is transferred from the other first treatment tank 3b to the other second treatment tank 4b through the line L22, and an adsorbent is transferred from the second treatment tank 4b to the first treatment tank 3b through the line L25.

On the other hand, in unsteady operation of the water treatment apparatus 1C according to the fourth embodiment of the present invention during backwashing of the first treatment tank 3a using backwash water introduced thereto through the backwash water line L31, the three-way valves 63a, 63b, 64a, and 64b are operated to change the flow path of water to be treated so that water to be treated is transferred from the first treatment tank 3b of the second set to the second treatment tank 4a of the first set through the line L22, the bypass line L71, and then the line L12. In parallel with this, the flow path of an adsorbent (adsorbent having phosphorus adsorbed thereto in the fluidized bed 22) is also changed so that an adsorbent is transferred from the second treatment tank 4a of the first set to the first treatment tank 3b of the second set through the line L15, the bypass line L72, and then the line L25.

According to the fourth embodiment of the present invention, it is possible to partially continue phosphorus adsorption treatment even during backwashing, thereby maintaining or improving treatment efficiency as a whole of the system.

It is to be noted that the water treatment apparatus according to the fourth embodiment of the present invention includes two sets of the first treatment tank and the second treatment tank, but the present invention is not limited thereto, and three or more sets of the first treatment tank and the second treatment tank may be provided.

The use of the water treatment apparatus according to the present invention makes it possible to suppress the influence on fluctuations in the concentration of phosphorus discharged to the outside of the system, suppress the influence of solids contained in water to be treated, reduce the occurrence of fouling of an adsorbent, and eliminate the necessity to use chemicals and the necessity to provide processes other than a phosphorus adsorption process (e.g., a phosphorus desorption process), thereby enabling phosphorus to be efficiently recovered from the water to be treated.

What is claimed is:

1. A water treatment apparatus comprising:
   a first treatment tank which receives water to be treated, and includes a first support, forming thereon a first, fixed bed comprising a powdery phosphorus adsorbent comprising an inorganic layered compound, wherein the first bed separates phosphorus and solid matter from the water, and recovers the phosphorus in a state adsorbed on the phosphorus adsorbent in the first bed, which is usable as it is;
   a second treatment tank which receives the water treated in the first treatment tank and a powdery phosphorus adsorbent comprising an inorganic layered compound, and includes a second support, forming a second, fluidized or fixed bed comprising the phosphorus adsorbent, wherein the second bed separates phosphorus from the water received from the first treatment tank, and recovers the phosphorus in a state adsorbed on the phosphorus adsorbent in the second bed, which is usable as it is; and
   a transferring device configured to transfer the phosphorus adsorbent, having phosphorus adsorbed thereon in the second treatment tank, from the second treatment tank to the first treatment tank.

2. The water treatment apparatus according to claim 1, wherein the second treatment tank is in a form of fluidized-bed reactor.

3. The water treatment apparatus according to claim 2, further comprising a separator configured to separate the phosphorus adsorbent from the water discharged from the second treatment tank.

4. The water treatment apparatus according to claim 3, wherein the separator is a centrifugal separator.

5. The water treatment apparatus according to claim 1, further comprising a centrifugal separator to separate the phosphorus adsorbent and solid matter from the water discharged from the first treatment tank.

6. The water treatment apparatus according to claim 1, further comprising backwash water introduction device configured to introduce the water discharged from at least one of the first treatment tank and the second treatment tank into the first treatment tank as backwash water for separating the phosphorus adsorbent and solid matter from the first bed.

7. The water treatment apparatus according to claim 1, wherein two or more first treatment tanks are arranged in parallel.

8. The water treatment apparatus according to claim 1, wherein two or more second treatment tanks are arranged in parallel downstream from the first treatment tank.

9. The water treatment apparatus according to claim 1, wherein the water to be treated is a liquid generated by solid-liquid separation of sludge in a process of treating sewage sludge originating biological water treatment.

10. The water treatment apparatus according to claim 1, wherein the phosphorus adsorbent is made of an inorganic layered anionic exchanger, and is in the form of hydrotalcite compound inorganic particles having an adsorption site.

* * * * *

UNITED STATES PATENT AND TRADEMARK OFFICE
CERTIFICATE OF CORRECTION

| | |
|---|---|
| PATENT NO. | : 8,329,031 B2 |
| APPLICATION NO. | : 12/694620 |
| DATED | : December 11, 2012 |
| INVENTOR(S) | : Moniwa et al. |

It is certified that error appears in the above-identified patent and that said Letters Patent is hereby corrected as shown below:

Claim 9, column 12, line 51, change "originating biological" to --originating from biological--.

Signed and Sealed this
Nineteenth Day of March, 2013

Teresa Stanek Rea
*Acting Director of the United States Patent and Trademark Office*